106. COMPOSITIONS, COATING OR PLASTIC.

97

Patented Dec. 20, 1932

1,891,269

UNITED STATES PATENT OFFICE

CHARLES L. NORTON, OF BOSTON, MASSACHUSETTS

CONCRETE

No Drawing.  Application filed November 14, 1930.  Serial No. 495,786.

My invention relates to hydraulic cement concretes, and consists essentially of a concrete mixture of which the chief if not the only ingredients are a hydraulic cement, such as Portland cement, and a finely powdered hard aggregate. The term "hydraulic cement" is herein used to include any cement which will set under water; examples of such cements are, magnesium oxid, oxychlorids of magnesium, zinc, or calcium, calcined or dehydrated gypsum, the lime, silica and alumina mixtures commercially known as Portland cement. The objects of invention are the provision of a concrete mixture which sets more rapidly than others, and in which the bond between the cement and the cemented ingredient is of superior tenacity, and which, when permanently set, is susceptible of receiving a high, glassy polish. A polished surface of such concrete material will resist accumulation of adherent dirt, and will be inert to all the usual chemicals in household cleansing fluids, as well as resisant to abrasion by cleansing and scouring powders. Concrete articles comprising hydraulic cement and a hard aggregate of comminuted or pulverized quartz sand, flint, etc. will be found susceptible of receiving a high polish, but the use of hard-burned kaolin as the sole, or predominant ingredient associated with the cement, because of the quick-setting of such concrete mixture, and also because of the unusually tenacious bond between the cement and kaolin in the final product, makes the product more amenable to polishing abrasion, which does not break the bond and remove aggregate particles as it is liable to do if other hard aggregates are employed.

The remarkable quick-setting property of a concrete mixture comprising hydraulic cement and hard-burned kaolin may be demonstrated as follows. Prepare for comparison mixtures of equal quantities of Portland cement and quartz sand, flint, or any other hard material (other than kaolin grog), and of equal mixtures of Portland cement and hard-burned kaolin (prepared as hereinbelow specified); grind each mixture, dry, in a ball mill until its particles are impalpably fine and practically unsusceptible of further dimensional reduction. In each mixture the cement and hard aggregate will be mutually and evenly distributed, so that every particle of each ingredient will have the same propinquity to particles of the other. Then make a water mixture of each pulverized solid mixture, using the quantity theoretically required for the setting of the cement therein, and cast each in a shallow tray, to equal depths. By the needle test, it will be determined that the cement-kaolin mixture starts its initial set in about two minutes, (initial setting in a few seconds has in some cases been observed) and is complete in ten minutes, whereas in the other mixture, initial set is detected in from two to two and a half hours and completed in about five hours.

For example, take the production of a slab or tile of concrete. Prepare a grog of kaolin by burning it at a temperature approximating to 3000° F., which is quite near to the fusing temperature, and then comminute the hard burned grog to a powder which will all pass a screen of one hundred mesh to the inch. (This material and its manufacture is described in the Harter and Kohler United States Patent, No. 1,530,620, dated March 17, 1925.) For thorough mixing, the hydraulic cement and kaolin grog should be ground together dry, as in a ball mill, until the mixture is reduced to a powder of particles of the proper average size. Such a powder will contain particles as fine as 300 mesh, and of sizes between that and 100 mesh, with, inevitably, a minor proportion of very fine particles. Finer comminution of the hard burned kaolin is hardly to be recommended for the reason that a mixture of a finer hard aggregate with hydraulic cement will set at a rate too rapid to control reliably. Comminuted hard burned kaolin coarser than that recommended will set rapidly, as contrasted with other aggregates, but will be found less amenable in the final product to the reception of an even polish and less satisfactory in the producible colorations.

The particle size recommended is of the same order as that of hydraulic cement, as usually obtainable; if therefore the mixture of the two principal, or sole, ingredients be rich in cement, preferably equal parts of cement and kaolin, the bond between the two will be of particle to particle throughout the mass, producing a desirable homogeneity, both in the body and on its exposed surfaces.

By preference, therefore, mix equal quantities of the powdered hard-burned kaolin with hydraulic cement, such as Portland cement, in water. The water-proportion may vary, since elimination of a large part of the water before initial setting of this cement is contemplated. For many purposes a creamy consistency will be found desirable.

If the tile or slab which is taken as an example is to be quite thin, evaporation will effectively reduce the water content prior to initial setting. If this mode of water reduction be resorted to, the creamy mixture should be subjected to vacuum before it is cast or spread on the mold-surface, so as to eliminate the air adsorbed on the originally dry particles of cement and kaolin. If, on the other hand, the water is to be eliminated in a filter press, the air will be carried out with the water.

If the open evaporation method be adopted, the mold or plate on which the concrete-cream is cast should be jarred or tapped so as to even the thickness of the cast material and level its surface, if, as is intended, the finally set article is to be polished. Mold or supporting surfaces, if the set tile is to be removed therefrom, should be of such material, or be so prepared, that the concrete material will not adhere to it.

In the open evaporation process, the approach of initial set should be watched for. When the originally wet and highly reflective surface of the cream changes to a dull, or matte surface, indicating that the mixture has ceased to be wet and fluid and has become only damp, water should be then extracted from its surface by application of bibulous material, such as blotting paper, and the material should then be immediately compacted as by roller pressure which need be no heavier than that produced by a hand-operated roller. Unless compacted, the material on setting will be of too open and spongy structure to receive a satisfactory polish. Or, pressure may be applied by means of a filter-sheet, as of cloth, stretched in a frame, and expressed water removed as it comes through the sheet. Roller pressure on the cloth is recommended, the roller may be of bibulous material, or be followed by any water-removing appliance. If a pervious filter pad, stiff enough to exert pressure on the surface of the concrete layer, be used to compress and compact it, and at the same time exhaust be applied to the upper surface of the pad, the effect of combined pressure and elimination of the last excess water will be satisfactorily produced.

If the tile be formed in a filter press, the press head against which the face of the tile is formed, should be lightly oiled, to prevent sticking of the material when the press is opened.

Whatever the mode of manufacture, precaution should be taken to prevent undue abstraction of water from the under, or reverse side, of the tile. If it be cast upon an impermeable plate, this requisite will be provided for; if on a permeable filter plate, the plate should be kept wet until the initial set of the concrete material is completed. It may be that prevention of abstraction of water from the under side of the cast shape is not so much the immediate desideratum as a precaution against local inhalation of air by the concrete material in the initial setting stage. I have observed that if the conditions of manufacture involve access of air to the under side of the cast shape during the process, the concrete material draws air into itself locally, producing bubbles or voids in its body, that such bubbles occasionally burst through the upper exposed surface, forming craters, and that these voids are of various and sometimes considerable size. Their presence is obviously detrimental and should be guarded against. Retention of saturation by water in a permeable base, or the employment of an impermeable base on which to make the cast, has been accompanied by non-production of bubbles or voids in the concrete body.

After initial setting, the tile should be kept in a moisture-saturated atmosphere for six or seven days, when it will be permanently set.

The bond between the cement and the hard-burned kaolin particles is highly tenacious. This may be due to the physical structure of the kaolin particles, which is quite different from that of other hard aggregates, such as fine quartz sand or flint, or to a chemical reaction between kaolin and cement, which the rapid setting of the mixture strongly suggests, or to both effects. Whatever the cause, the tenacious bond between the cement and kaolin produces material highly suited to reception of polish, since the kaolin particles are firmly seated and resist dislodgment by abrasives.

Since cement is relatively soft, the tile or plate, constructed as above described, should be treated with any of the known cement hardening solutions, such as a silico fluoride, and should be kept wet with such solution during polishing, which may be done with carborundum powder and metal wheels, or with carborundum disks.

Articles of manufacture, of which a tile or slab furnishes an example, made of the material and in the manner above described, will be found well adapted to structural purposes, interior finish particularly, because their polished surfaces are too hard to be scratched with scouring powders, and are too close grained and smooth to catch dirt, and are chemically resistant to all ordinary household cleansing chemicals, whether acid or alkaline.

The cement and kaolin mixture produces an article of pleasing tint, of light cream color. Other colors can be given to it by grinding pigments in with the hard-burned kaolin.

I claim:

1. Concrete of hydraulic cement and hard-burned kaolin comminuted to particle size of the same order as that of the cement.

2. Concrete of hydraulic cement and hard-burned kaolin in approximately equal quantity, the kaolin comminuted to particle size of the same order as that of the cement.

Signed by me at Cambridge, Massachusetts, this 13th day of November, 1930.

CHARLES L. NORTON.